US009559770B2

(12) United States Patent
Bottari et al.

(10) Patent No.: US 9,559,770 B2
(45) Date of Patent: Jan. 31, 2017

(54) WSON RESTORATION

(75) Inventors: Giulio Bottari, Leghorn (IT); Diego Caviglia, Savona (IT); Daniele Ceccarelli, Genoa (IT)

(73) Assignee: TELEFONAKTIEBOLAGET LM ERICSOSN (publ), Stockholm (SE)

( * ) Notice: Subject to any disclaimer, the term of this patent is extended or adjusted under 35 U.S.C. 154(b) by 236 days.

(21) Appl. No.: 14/344,973

(22) PCT Filed: Oct. 12, 2011

(86) PCT No.: PCT/EP2011/067775
§ 371 (c)(1),
(2), (4) Date: Sep. 23, 2014

(87) PCT Pub. No.: WO2013/037426
PCT Pub. Date: Mar. 21, 2013

(65) Prior Publication Data
US 2015/0244453 A1  Aug. 27, 2015

(30) Foreign Application Priority Data
Sep. 15, 2011  (EP) .................................. 11181459

(51) Int. Cl.
*H04B 10/032*    (2013.01)
*H04B 10/2575*   (2013.01)
(Continued)

(52) U.S. Cl.
CPC ........ *H04B 10/032* (2013.01); *H04B 10/2575* (2013.01); *H04J 14/00* (2013.01);
(Continued)

(58) Field of Classification Search
CPC .......................... H04J 14/0267; H04J 14/0287
(Continued)

(56) References Cited

U.S. PATENT DOCUMENTS 7,072,580 B2 *  7/2006  Arecco ................. H04J 14/022
                                                 398/20
7,224,897 B1 *  5/2007  Slezak ............... H04J 14/0227
                                                 398/10
(Continued)

FOREIGN PATENT DOCUMENTS

CN   101075956 A   11/2007
CN   101374107 A    2/2009
(Continued)

OTHER PUBLICATIONS

Office Action issued by the State Intellectual Property Office of China in related Patent Application No. 201180074871.2, dated May 27, 2016, 6 pages (Translation: 8 pages).

*Primary Examiner* — David Payne
*Assistant Examiner* — Tanya Motsinger
(74) *Attorney, Agent, or Firm* — Rothwell, Figg, Ernst, & Manbeck, P.C.

(57) ABSTRACT

Dynamic restoration involves routing and bandwidth assignment of an unplanned restoration path in a wavelength switched optical network (20), having regeneration nodes (60), nodes each having a ROADM (62) having drop paths and add paths. An electrical switch (68) provides configurable regeneration capacity by coupling selected drop paths to selected add paths. Some of the configurable regeneration capacity is kept for unplanned restoration paths. A PCE determines (120) routing and bandwidth assignments for an unplanned restoration path for the traffic flow to avoid a fault, and sends (130) configuration messages to the nodes to set up the unplanned restoration path dynamically and to configure the electrical switch to provide regeneration on the path. Keeping some reconfigurable regeneration capacity enables much longer unplanned paths to be found to avoid faults, and enables wavelength conversion if needed. Thus (Continued)

the reliability of finding at least one path avoiding the fault can be increased.

22 Claims, 13 Drawing Sheets

(51) Int. Cl.
   *H04J 14/00* (2006.01)
   *H04Q 11/00* (2006.01)
   *H04J 14/02* (2006.01)

(52) U.S. Cl.
   CPC ...... *H04J 14/0212* (2013.01); *H04J 14/0257* (2013.01); *H04J 14/0267* (2013.01); *H04J 14/0268* (2013.01); *H04J 14/0284* (2013.01); *H04Q 11/0005* (2013.01); *H04J 14/0209* (2013.01); *H04J 14/0217* (2013.01); *H04J 14/0271* (2013.01); *H04Q 2011/0043* (2013.01)

(58) Field of Classification Search
   USPC .......................................................... 398/2
   See application file for complete search history.

(56) References Cited

U.S. PATENT DOCUMENTS

| | | | | |
|---|---|---|---|---|
| 7,415,208 B1* | 8/2008 | Haggans | H04J 14/0227 | 398/49 |
| 7,606,494 B1* | 10/2009 | Weston-Dawkes | H04J 14/0212 | 398/48 |
| 8,150,257 B1* | 4/2012 | Choudhury | H04L 41/0681 | 398/175 |
| 2002/0041410 A1* | 4/2002 | Patel | H04J 14/0227 | 398/7 |
| 2002/0186432 A1* | 12/2002 | Roorda | H04J 14/0204 | 398/82 |
| 2004/0220886 A1* | 11/2004 | Kumaran | G06Q 30/0283 | 705/400 |
| 2008/0205901 A1* | 8/2008 | Bai | H04J 14/0201 | 398/155 |
| 2009/0022489 A1* | 1/2009 | Way | H04J 14/0204 | 398/4 |
| 2010/0220995 A1 | 9/2010 | Lee et al. | | |
| 2011/0081147 A1 | 4/2011 | Lee et al. | | |
| 2011/0229122 A1* | 9/2011 | Castoldi | H04J 14/0227 | 398/2 |
| 2012/0201539 A1* | 8/2012 | Boertjes | H04J 14/0204 | 398/51 |
| 2012/0250580 A1* | 10/2012 | Testa | H04J 14/0201 | 370/254 |
| 2013/0272693 A1* | 10/2013 | Zhang | H04J 14/0212 | 398/5 |
| 2013/0315580 A1* | 11/2013 | Boertjes | H04J 14/0204 | 398/5 |
| 2014/0279136 A1* | 9/2014 | Pacella | H04L 41/5029 | 705/26.3 |
| 2014/0341572 A1* | 11/2014 | Sambo | H04J 14/0257 | 398/48 |
| 2015/0016815 A1* | 1/2015 | Maggiari | H04J 14/0287 | 398/5 |
| 2015/0055945 A1* | 2/2015 | Wellbrock | H04B 10/032 | 398/2 |
| 2015/0244453 A1* | 8/2015 | Bottari | H04J 14/00 | 398/5 |
| 2015/0256253 A1* | 9/2015 | Bottari | H04J 14/0268 | 398/28 |

FOREIGN PATENT DOCUMENTS

| | | |
|---|---|---|
| WO | 2010022662 A1 | 3/2010 |
| WO | 2011021976 A1 | 2/2011 |

* cited by examiner

WSON RESTORATION

CROSS-REFERENCE TO RELATED APPLICATIONS

This application is a 35 U.S.C. §371 National Phase Entry Application from PCT/EP2011/067775, filed Oct. 12, 2011, and designating the United States, which claims priority to European Application No. 11181459.6, filed Sep. 15, 2011. The above-mentioned applications are incorporated by reference herein.

FIELD

The present invention relates to methods of dynamic restoration in a wavelength switched optical network, to methods of using a regeneration node in such a network, to corresponding computer programs, to methods of adapting such a network to provide dynamic restoration, to path computation elements for such a network, and to regeneration nodes for such a network.

BACKGROUND

A Wavelength Switched Optical Network (WSON) supports end-to-end optical paths, called lightpaths, between nodes requiring connection in the network. Intermediate nodes in this type of network support wavelength switching and may also support wavelength conversion. In contrast with point-to-point optical communication links which provide high-capacity transport, always between the same pair of nodes, a WSON supports the setting up and tearing down of lightpaths between pairs of nodes of a network having a more complex topology, such as a ring, interconnected rings or mesh topology. A Routing and Wavelength Assignment (RWA) function is typically carried out by a path computation element PCE of the WSON and involves routing a lightpath across the WSON and assigning a wavelength to the lightpath.

WSON is a standardization effort of the Internet Engineering Task Force (IETF). WSON is the application of a GMPLS based control plane and PCE to an "all optical" network, that is, no electrical switching is part of the WSON scope. The state of the art was a network landscape based on multi-degree ROADMs with the ability to switch (for recovery purposes) in few minutes on alternative paths defined in a planning phase.

For any restoration to use an alternative path to avoid a fault, two options are in theory on the table: Pre-Planned (PP) and On-The-Fly (OTF). In the PP option, computation of the alternate path is performed before service delivery, therefore the computation is not time-critical: this allows long and fully accurate computations to be performed, important when considering optical impairments which limit the length of paths. The computation not being time-critical allows its execution in an off-line dedicated computation element, with fully detailed network information. Computation may be performed together with network design, including hardware equipment requirement definition: this is needed if lightpaths require regeneration. Once computed, the recovery path is reserved in the network. This has two main advantages: recovery resources cannot be "stolen" by any other user and path computation time does not affect recovery time.

In the OTF option, computation is time-critical, as its time adds to the restoration time: this requires computation and information to be summarized. Time-criticality also recommends the computation to be performed close to the network, to avoid communication overhead: for this reason, OTF path computation is normally performed in a distributed environment in the network nodes, with summarized information and limited visibility, which may also lead to resource conflict.

As stated before, operators see the OTF as enabling reduced CAPEX compared to implementing PP restoration for multiple faults since PP requires so much spare capacity to be installed and reserved. Nevertheless, currently for GMPLS controlled wavelength switched optical networks, pre-planned protection paths are still preferred because the chance is too high that an OTF computation will fail to find any alternative path. This is because of the need for wavelength continuity and the limitations of optical reach, since it is too expensive to have wavelength conversion or optical regeneration throughout the network.

SUMMARY

Embodiments of the invention provide improved methods and apparatus. According to a first aspect of the invention, there is provided a method of dynamic restoration by routing and bandwidth assignment of an unplanned restoration path in a wavelength switched optical network, to restore a traffic flow after a fault, the wavelength switched optical network having multiple nodes, of which one or more are regeneration nodes, the regeneration nodes each having a ROADM having optical drop paths and optical add paths, the regeneration nodes also having electrical drop paths coupled by O/E converters to respective ones of the optical drop paths, and electrical add paths coupled by E/O converters to the optical add paths. An electrical switch is provided for making interconnections between the converters to provide configurable regeneration capacity by coupling selected ones of the electrical drop paths to respective selected ones of the electrical add paths. The method involves determining before the fault occurs, what bandwidth is currently available between at least some of the nodes, and how much of the configurable regeneration capacity is currently available at the regeneration nodes. Assignment of at least some of the configurable regeneration capacity is restricted so that at least some remains available for unplanned restoration paths. After detection of the fault, there is a step of determining routing and bandwidth assignments for the unplanned restoration path for the traffic flow avoiding the fault, and if needed, assigning some of the currently available configurable regeneration capacity to the unplanned restoration path. Configuration messages are sent to the nodes of the determined route to set up the unplanned restoration path dynamically and to configure the electrical switch at a respective one of the regeneration nodes according to the assignment of regeneration capacity, and to reroute the traffic flow onto the unplanned restoration path.

A benefit of keeping at least some of the regeneration capacity for such unplanned restoration paths is that it enables much longer unplanned paths to be used to avoid faults, and enables wavelength conversion if needed. These effects can greatly increase the reliability of finding at least one path avoiding the fault, which is increasingly useful as planned paths fill up more of the capacity to increase bandwidth utilization efficiency, or is useful in providing more resilience to multiple faults over a wide area. By reducing the chance of complete blocking of the traffic flow, less free bandwidth or redundancy need be provided in the network, and thus a trade-off between service level and bandwidth utilization can be improved. Thus the cost per quantity of traffic flows served can be improved. Also, the method is compatible with existing routing algorithms and is not dependent on whether the routing is carried out centrally or is distributed, see FIGS. 2 and 3.

Any additional features can be added, some such additional features are set out below. The method can have the step, before setting up the unplanned restoration path, of trying to use a planned protection path for the traffic flow, and then sending the configuration messages if the planned protection path fails. A benefit of this combination of planned and unplanned paths is a better trade-off between reducing data loss during delays in setting up the unplanned paths, and reducing a chance of complete data loss from failure of all paths, see FIG. 5.

The electrical switch can comprise an OTN switch supporting G.709 framing, and the step of determining the currently available regeneration capacity comprises the step of receiving OTN advertisements from the OTN switch, and the step of sending configuration messages to the electrical switch comprises sending OTN switch configuration messages. A benefit of such a switch is that existing technology can be used which is commercially available and thus less costly to develop and maintain, and enables use of features such as OAM and error correction, see FIGS. 6, 7 and 8.

The electrical switch can be an external equipment, external to the ROADM. This can make it easier to add more regeneration capacity to existing networks, or to move capacity to different locations, and enables conventional ROADMs to be used. Thus flexibility and cost can be improved, see FIGS. 7 and 8.

The network can be a multi-rate network capable of switching traffic flows of different bit rates, and the electrical switch being configurable to switch traffic flows of different bit rates, and the step of determining the currently available regeneration capacity can comprise determining for the electrical switch how many new traffic flows of each of the different bit rates can be switched, and the step of sending configuration messages can comprise sending messages to the electrical switch to configure the bit rate to be switched. This can enable traffic flows of different rates to be accommodated more efficiently, see FIG. 9.

At least some of the E/O converters can have a tunable optical wavelength, and the step of sending configuration messages can comprise sending messages to tune the optical wavelength of a tunable converter used in the restoration path. This means the converters no longer need to be statically related to a particular light path, and so can be made available for use on one of many lightpaths. This increases flexibility and thus helps enable higher bandwidth utilization, see FIGS. 11 and 12.

The regeneration node can have a wavelength switching element for switching an add optical signal to one of two or more outputs coupled to different neighbouring nodes, and the step of sending configuration messages comprises sending messages to configure the wavelength switching element to set up the restoration path. This combination of ROADM and optical switching can make the regeneration node "directionless" which can help increase flexibility and increase numbers of possible routes, or can concentrate the equipment, and reduce the number of nodes needed, thus reducing costs, see FIG. 12.

The network can have one or more path computation elements, the path computation elements each having a dedicated module for carrying out the step of determining the routing and bandwidth assignments for the unplanned restoration path for the traffic flow avoiding the fault. This enables the function to be added to existing PCEs, so that it can meet tighter time constraints than are needed for routing of planned paths, yet share use of the same databases and message passing functions for example.

Another aspect of the invention provides a method of using a regeneration node for dynamic restoration using an unplanned restoration path in a wavelength switched optical network, to restore a traffic flow after a fault, the wavelength switched optical network having a path computation element and having multiple nodes, of which one or more are regeneration nodes. The regeneration nodes each have a ROADM having optical drop paths and optical add paths, and the node has electrical drop paths coupled by O/E converters to respective ones of the optical drop paths, and electrical add paths coupled by E/O converters to the optical add paths. An electrical switch is provided for configuring the converters to provide configurable regeneration capacity by coupling selected ones of the electrical drop paths to respective selected ones of the electrical add paths. The method involves steps of: before the fault, sending messages to the path computation element indicating how much of the configurable regeneration capacity is currently available for unplanned restoration paths, and, after detection of the fault, and receiving configuration messages from the path computation element indicating an assignment of regeneration capacity for an unplanned restoration path. The method then involves configuring the electrical switch according to the indicated assignment, and regenerating the traffic flow on the unplanned restoration path. Another aspect provides a computer program stored on a computer readable medium and having instructions which when executable by a processor, cause the processor to carry out any of the above-mentioned methods.

Another aspect provides a method of adapting a wavelength switched optical network to provide for dynamic restoration to restore a traffic flow after a fault, the wavelength switched optical network having multiple nodes and a path computation element. There is a step of providing one or more regeneration nodes, the regeneration nodes each having a ROADM having optical drop paths and optical add paths, the regeneration nodes also having electrical drop paths coupled by O/E converters to respective ones of the optical drop paths, and electrical add paths coupled by E/O converters to the optical add paths. An electrical switch for making interconnections between the converters to provide configurable regeneration capacity by coupling selected ones of the electrical drop paths to respective selected ones of the electrical add paths. There is also a step of adapting the path computation element so as before the fault, it determines what bandwidth is currently available between at least some of the nodes, and how much of the configurable regeneration bandwidth is currently available at the regeneration nodes. It restricts assignment of at least some of the configurable regeneration capacity so that some remains available for unplanned restoration paths. The method also has the step of adapting the path computation element so that it determines, after detection of the fault, routing and bandwidth assignments for the unplanned restoration path for the traffic flow avoiding the fault, and if needed, assign some of the currently available configurable regeneration capacity to the unplanned restoration path. It is also adapted so as to send configuration messages to the nodes of the determined route, to set up the unplanned restoration path dynamically and to configure the electrical switch at a respective one of the regeneration nodes according to the assignment of regeneration capacity, and to reroute the traffic flow onto the unplanned restoration path. This corresponds to the methods set out above, but directed to upgrading an existing network for example by an equipment/software provider on behalf of the network operator.

Any additional features can be added to this aspect, some are set out here. The adapting of the path computation element can be arranged so that, before setting up the unplanned restoration path, the path computation element tries to use a planned protection path for the traffic flow, and then sends the configuration commands if the planned protection path fails. A benefit of this combination of planned and unplanned paths is a better trade-off between reducing data loss during delays in setting up the unplanned paths, and reducing a chance of complete data loss from failure of all paths.

The electrical switch can comprise an OTN switch supporting G.709 framing, and the step of adapting the path computation element can be arranged so that it determines the currently available regeneration capacity by receiving OTN advertisements from the OTN switch, and it sends configuration messages in the form of OTN switch configuration messages. A benefit of such a switch is that existing technology can be used which is commercially available and thus less costly to develop and maintain, and enables use of features such as OAM and error correction.

The step of providing the regeneration node can comprise adding the electrical switch externally to the ROADM. This can make it easier to add more regeneration capacity to existing networks, or to move capacity to different locations, and enables conventional ROADMs to be used. Thus flexibility and cost can be improved.

The network can be a multi-rate network capable of switching traffic flows of different bit rates, and the electrical switch can be configurable to switch traffic flows of different bit rates, the step of adapting the path computation element having the step of adapting it to determine the currently available regeneration capacity by determining for the electrical switch how many new traffic flows of each of the different bit rates can be switched, and adapting the step of sending configuration messages by sending messages to the electrical switch to configure the bit rate to be switched. This can enable traffic flows of different rates to be accommodated more efficiently.

Another aspect provides a path computation element for routing and bandwidth assignment for a wavelength switched optical network having multiple nodes, of which one or more are regeneration nodes. The regeneration nodes each have a ROADM having optical drop paths and optical add paths, and the regeneration nodes also have electrical drop paths coupled by O/E converters to respective ones of the optical drop paths, electrical add paths coupled by E/O converters to the optical add paths. An electrical switch is provided for making interconnections between the converters to provide configurable regeneration capacity by coupling selected ones of the electrical drop paths to respective selected ones of the electrical add paths. The path computation element has a communications link to the nodes and a processor arranged to determine, before a fault occurs, what bandwidth is currently available between at least some of the nodes, and how much of the configurable regeneration capacity is currently available at the regeneration nodes. Assignment of at least some of the configurable regeneration capacity is restricted so that at least some remains available for unplanned restoration paths, and after detection of a fault, the processor is further arranged to determine routing and bandwidth assignments dynamically for an unplanned restoration path for restoring the traffic flow avoiding the fault, and if needed, assign some of the currently available regeneration capacity to the unplanned restoration path. The processor is further arranged to send configuration messages to the nodes of the determined route, to set up the unplanned restoration path dynamically and to configure the electrical switch at a respective one of the regeneration nodes according to the assignment of regeneration capacity and to reroute the traffic flow onto the unplanned restoration path. This corresponds to the aspects set out above, but expressed in apparatus terms.

Again any additional features can be added to this aspect. For example the processor can be arranged to, before setting up the unplanned restoration path, try to use a planned protection path for the traffic flow, and then to send the configuration messages if the planned protection path fails.

The electrical switch can comprise an OTN switch supporting G.709 framing, and the processor can be arranged to determine the currently available regeneration capacity by receiving OTN advertisements from the OTN switch, and the processor being arranged to send the configuration messages in the form of OTN switch configuration messages.

The network can be a multi-rate network capable of switching traffic flows of different bit rates, and the electrical switch can be configurable to switch traffic flows of different bit rates, the processor being arranged to determine the currently available regeneration capacity by determining for the electrical switch how many new traffic flows of each of the different bit rates can be switched, and the processor being arranged to send messages to the electrical switch to configure the bit rate to be switched.

At least some of the E/O converters can have a tunable optical wavelength, and the processor can be arranged to send configuration messages to tune the optical wavelength of a tunable converter used in the restoration path.

If the regeneration node has a wavelength switching element for switching an add optical signal to one of two or more outputs coupled to different neighbouring nodes, the processor can be arranged to send configuration messages to configure the wavelength switching element to set up the restoration path.

Another aspect provides a regeneration node for a wavelength switched optical network, the wavelength switched optical network having a path computation element and having multiple nodes, of which one or more are regeneration nodes, the regeneration node having a ROADM having optical drop paths and optical add paths. The regeneration node also has electrical drop paths coupled by O/E converters to respective ones of the optical drop paths, and electrical add paths coupled by E/O converters to the optical add paths. An electrical switch is provided for making interconnections between the converters to provide configurable regeneration capacity by coupling selected ones of the electrical drop paths to respective selected ones of the electrical add paths. The regeneration node has a communications link for messages to or from the path computation element and is arranged to send messages to the path computation element to indicate how much of the configurable regeneration capacity is currently available, before any fault is detected. The regeneration node is arranged to receive a configuration message from the path computation element after a fault has been detected, the configuration message indicating an assignment of the configurable regeneration capacity. The regeneration node is arranged to configure the ROADM and the electrical switch according to the received assignment and to regenerate the traffic flow on the unplanned restoration path.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

Figure 1:
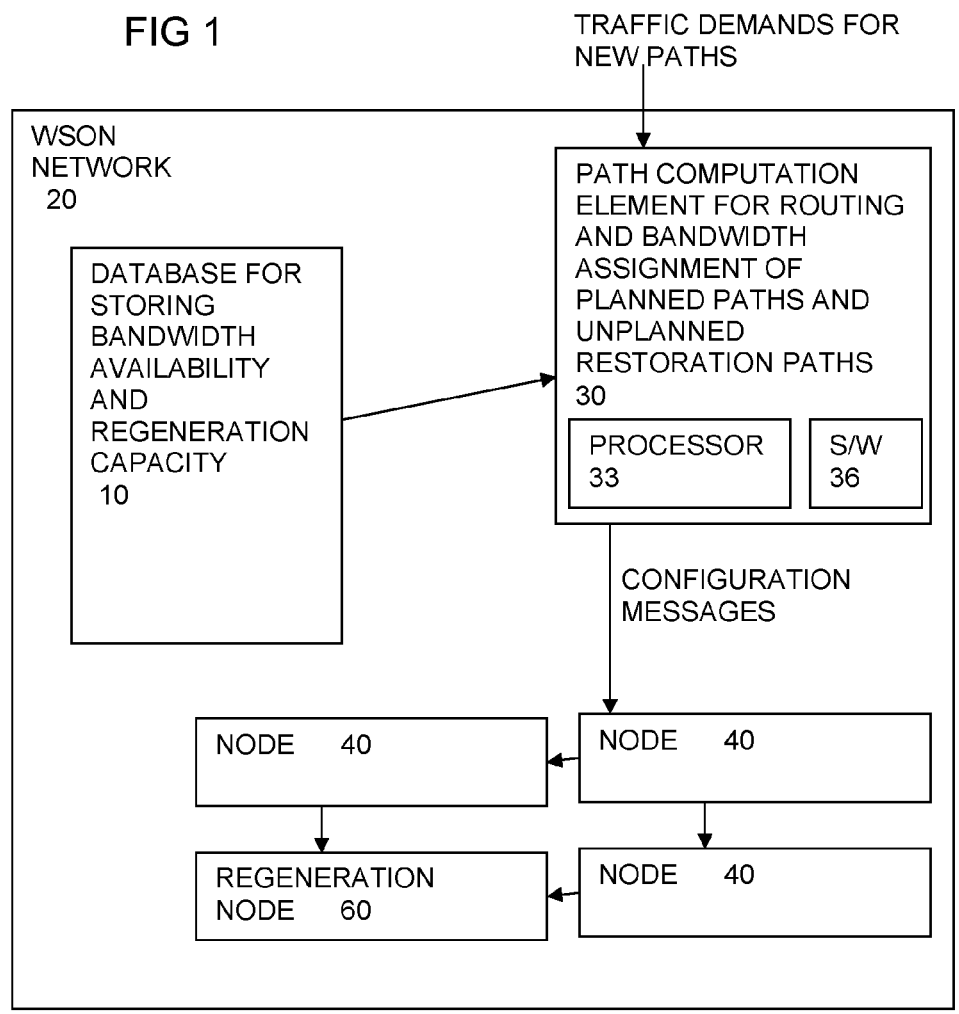
FIG. 1 shows a schematic view of a network.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

ABBREVIATIONS

CADU Colorless Add Drop Unit
DWDM XFP Dense Wavelength Division Multiplex 10 Gigabit Small Form factor Pluggable transceiver
IETF Internet Engineering Task Force
GMPLS Generalized MultiProtocol Label Switching
OTF On-the-fly
PCE Path Computation Element
PP pre-Planned
ROADM Reconfigurable optical add drop multiplexer/demultiplexer
TCO Total Cost of Ownership (CAP EX+OPEX)
WSON Wavelength Switched Optical Network
CAPEX Capital expenditure
OPEX Operating expenditure

DEFINITIONS

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to switches can encompass switches or switch matrices or cross connects of any type, whether or not the switch is capable of processing or dividing or combining the data being switched.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

References to optical paths can refer to spatially separate paths or to different wavelength paths multiplexed together with no spatial separation for example.

Introduction

By way of introduction to the embodiments, how they address some issues with conventional designs will be explained. An issue that prevents a real OTF implementation is that path computation cannot involve any design aspect: path computation must operate considering the network resources already in place. If regeneration is needed and a regenerator is not available in the desired location, the path request simply fails. Unfortunately, in large networks, regenerators are always required and these resources need to be pre-planned before being used. No OTF recovery schemes will work in the current WSON scenario.

To address this, the embodiments described are based on providing a flexible "pit-stop" station for lightpaths for dynamic distributed WSON. These enable a method of computing restoration paths with a reconfigurable detour of the wavelengths that need 3R regeneration towards an external electrical switch connected to pairs of transponders or DWDM XFPs. This provides configurable regeneration capacity which can facilitate routing and wavelength assignment (adding a degree of freedom for both physical feasibility and wavelength conversion) and thus reduces the chance of complete blocking that prevents a real OTF implementation in WSON.

PCE and GMPLS

WSON networks typically are controlled according to Generalized Multiprotocol Label Switching (GMPLS). This provides a control plane framework to manage arbitrary connection oriented packet or circuit switched network technologies. Two major protocol functions of GMPLS are Traffic Engineering (TE) information synchronization and connection management. The first function synchronizes the TE information databases of the node in the network and is implemented with either Open Shortest Path First Traffic Engineering (OSPF-TE) or Intermediate System to Intermediate System Traffic Engineering (ISIS-TE). The second function, managing the connection, is implemented by Resource ReSerVation Protocol Traffic Engineering (RSVP-TE).

The Resource ReSerVation Protocol (RSVP) is described in IETF RFC 2205, and its extension to support Traffic Engineering driven provisioning of tunnels (RSVP-TE) is described in IETF RFC 3209. Relying on the TE information, the GMPLS supports hop-by-hop, ingress and centralized path computation schemes. In hop-by-hop path calculation, each node determines only the next hop, according to its best knowledge. In the case of the ingress path calculation scheme, the ingress node, that is the node that requests the connection, specifies the route as well.

In a centralized path computation scheme, a function of the node requesting a connection, referred to as a Path Computation Client (PCC) asks a Path Computation Element (PCE), to perform the path calculations, as described in IETF RFC 4655: "A Path Computation Element (PCE)-Based Architecture". In this scheme, the communication between the Path Computation Client and the Path Computation Element can be in accordance with the Path Computation Communication Protocol (PCEP), described in IETF RFC 5440.

FIG. 1, Network View

Figure 2:
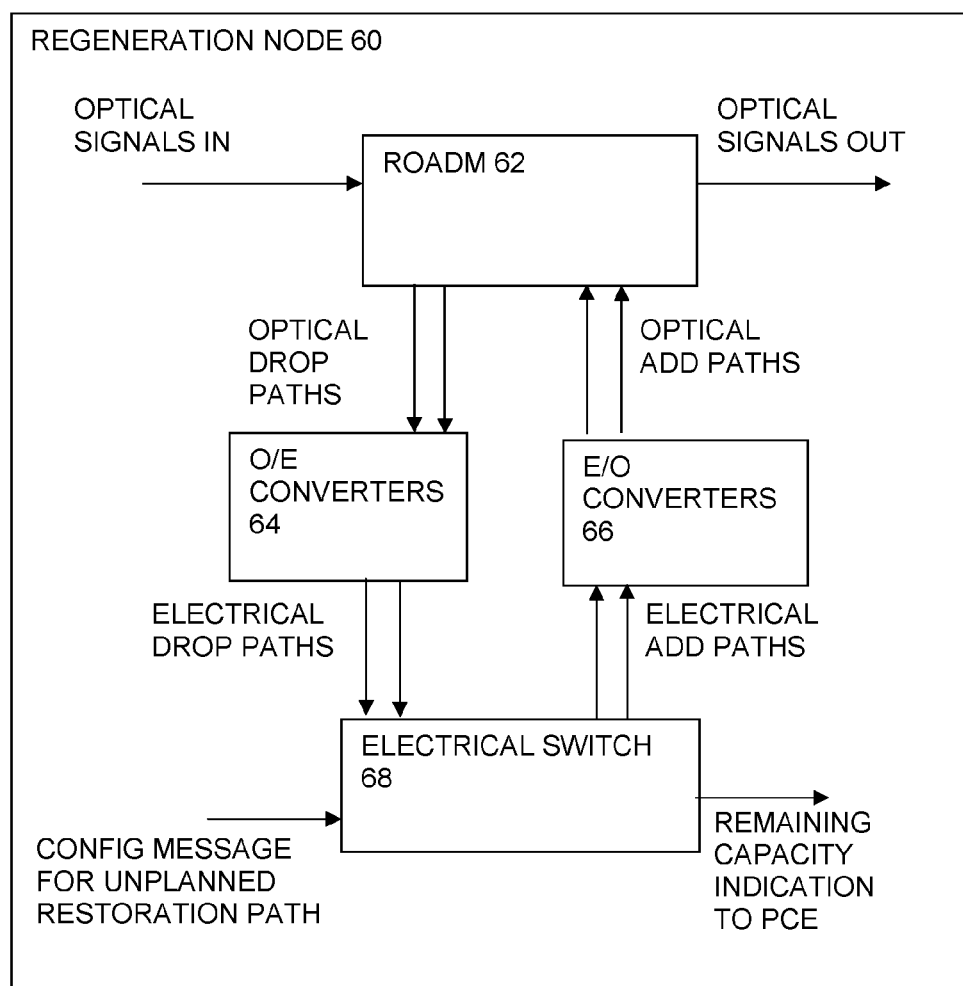
FIG. 2 shows a schematic view of a regeneration node

FIG. 1 shows a schematic view of parts of a WSON network 20. In a real network there can be many more nodes and links, not shown here for the sake of clarity. A path computation element 30 is for routing and bandwidth assignment of planned paths and of unplanned restoration paths, and may be implemented by a processor 33 running software 36. A database 10 is provided (either within or outside the PCE) for storing bandwidth availability and regeneration capacity. This can be located remotely in principle, provided it is accessible by the PCE. The PCE is in contact with nodes 40 and some of the nodes may be regeneration nodes 60. An example of a regeneration node is shown in FIG. 2. Configuration messages are sent from the PCE to the nodes to set up the paths in the network. The PCE may be distributed amongst the nodes, or be centralized. The nodes may return indications of availability of capacity, or the PCE may update the availability in the database as it sets up new paths.

FIG. 2, Regeneration Node

FIG. 2 shows a schematic view of a regeneration node according to an embodiment. A ROADM 62 has an input path for optical signals which can be wavelength multiplexed signals, and an output path for wavelength multiplexed optical signals. Individual wavelengths or some part of the bandwidth can be divided out optically onto optical drop paths. Individual wavelengths or some part of the bandwidth can be added from optical add paths into the wavelength multiplexed output. Converters are provided on the add paths and the drop paths, to enable an electrical switch 68 to interconnect the add and drop paths. O/E converters 64 provide optical to electrical conversion from the optical drop paths to the corresponding electrical drop paths. E/O converters 66 provide electrical to optical conversion from the electrical add paths to corresponding optical add paths.

The configuration of the electrical switch can be changed dynamically based on configuration messages from the PCE, to select which of the add paths are coupled to which of the drop paths. The converters may have a fixed wavelength or in some cases, as described below in relation to FIG. 10, they may be tunable, to output a selectable wavelength on the optical add path, or in the case of the O/E converter, have a tunable optical filter to select which wavelength is received and converted to an electrical signal.

The node also may in some cases have circuitry for recording what configurable regeneration capacity remains available, such as how many paths, which drop wavelengths, which add wavelengths, whether they are tunable, tuning range, whether they can be switched to or from different neighboring nodes, optical parameters such as output optical powers and so on. Such information can be passed back to the PCE typically via messages sent to other nodes on overhead channels using existing standards.

Figure 3:
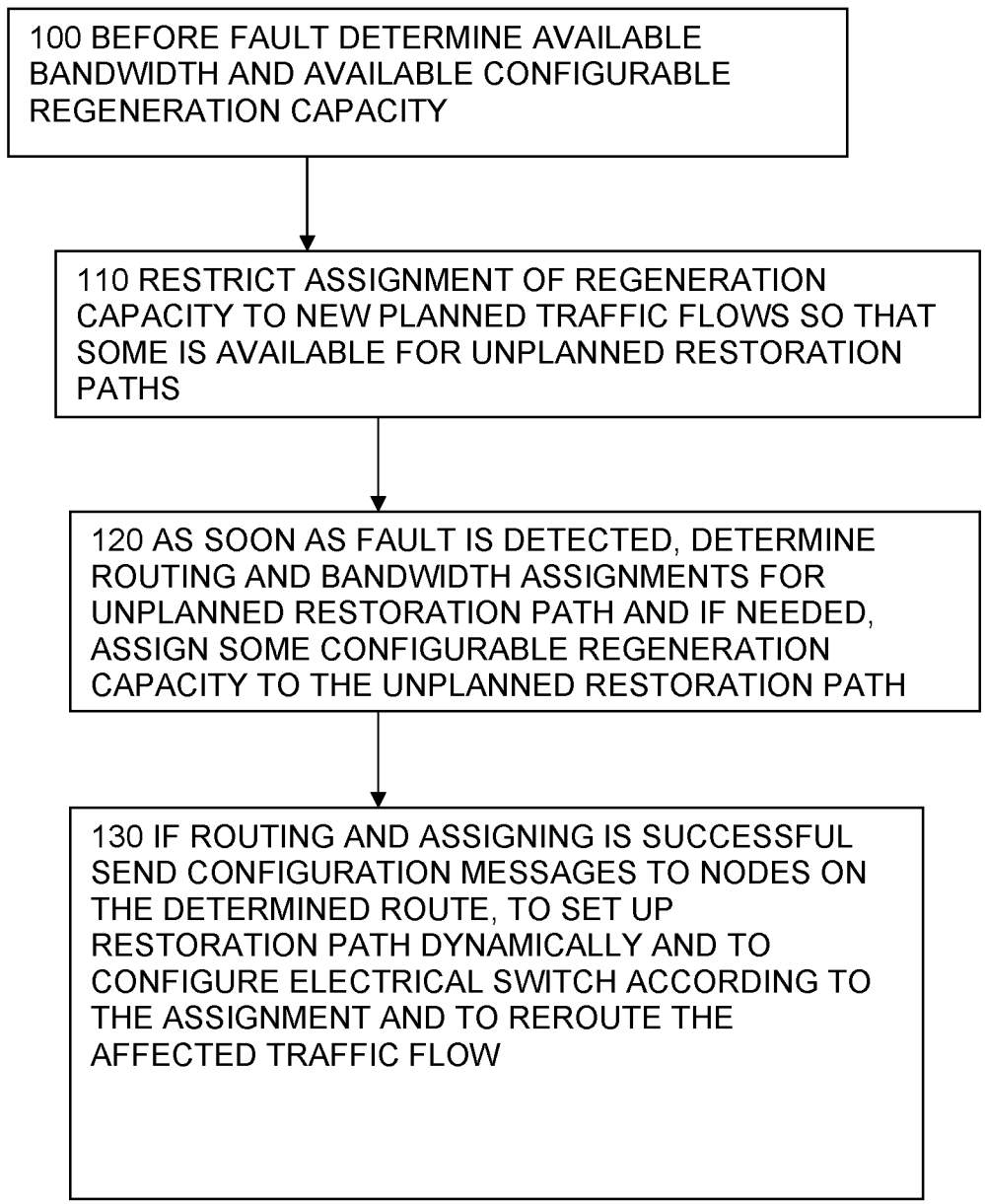
FIG. 3 shows steps of a method according to an embodiment

FIG. 3 Method Steps at PCE According to an Embodiment

FIG. 3 shows some of the steps carried out by the PCE according to an embodiment. In step 100, before a fault, available bandwidth and available configurable regeneration capacity is determined. At step 110 assignment of regeneration capacity to new planned traffic flows is restricted so that some is available for unplanned restoration paths.

At step 120, as soon as a fault is detected, routing and bandwidth assignments are determined for an unplanned restoration path and if needed, some configurable regeneration capacity is assigned to the unplanned restoration path. In some cases, unplanned restoration paths may be possible without using the regeneration. At step 130, if routing and assigning is successful, then configuration messages are sent to nodes on the determined route, to set up restoration path dynamically and to configure the electrical switch according to the assignment and to reroute the affected traffic flow.

Figure 4:
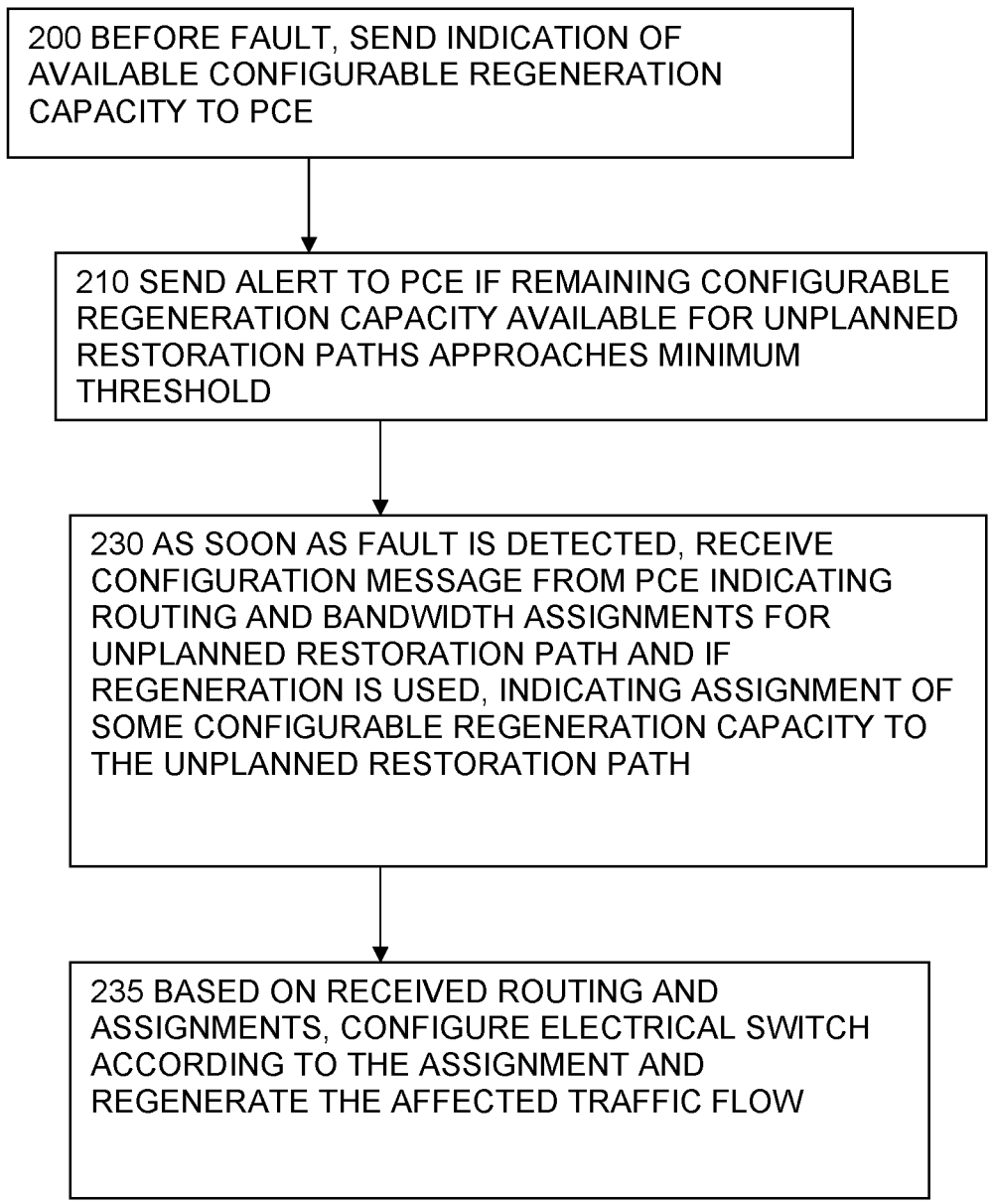
FIGS. 4-6 show steps of methods according to further embodiments.

FIG. 4 Method Steps at Regeneration Node According to an Embodiment

FIG. 4 shows some of the steps carried out by a regeneration node. At step 200, before a fault, the node sends an indication of available configurable regeneration capacity to the PCE. At step 210 it sends an alert to the PCE if remaining configurable regeneration capacity available for unplanned restoration paths approaches a minimum threshold. As soon as a fault is detected, at step 230, the node receives a configuration message from the PCE indicating routing and bandwidth assignments for an unplanned restoration path and if regeneration is used, indicating assignment of some configurable regeneration capacity to the unplanned restoration path. At step 235, based on received routing and assignments, the node configures its electrical switch according to the assignment and regenerates the affected traffic flow.

Figure 5:
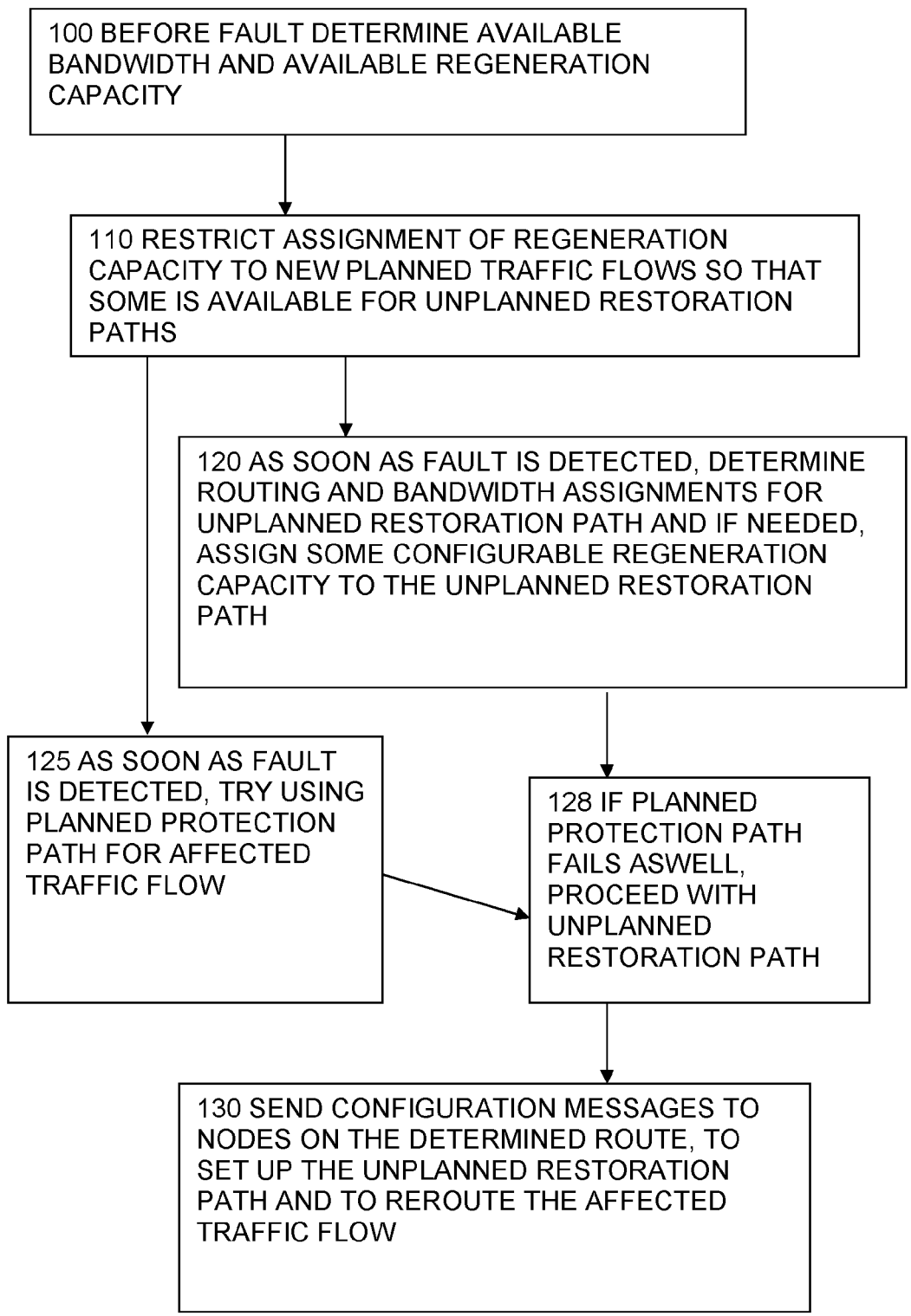

FIG. 5, PCE Steps for Combination of PP and OTF According to an Embodiment

FIG. 5 shows steps for an embodiment using a pre-planned protection path before the dynamic unplanned restoration is used. The PCE steps shown in FIG. 3 can be modified as follows. A step 125 follows as soon as a fault is detected in which a planned protection path is used for the affected traffic flow. In parallel, the PCE can carry out step 120 in which routing and bandwidth assignments are determined for an unplanned restoration path and if needed, some configurable regeneration capacity is assigned to the unplanned restoration path. In some cases, unplanned restoration paths may be possible without using the regeneration. At step 128, only if the planned protection path fails does the procedure for the unplanned restoration path proceed. At step 130, if routing and assigning is successful, then configuration messages are sent to nodes on the determined route, to set up restoration path dynamically and to configure the electrical switch according to the assignment and to reroute the affected traffic flow. A corresponding procedure at the regeneration node can be similar to that shown in FIG. 4.

Figure 6:
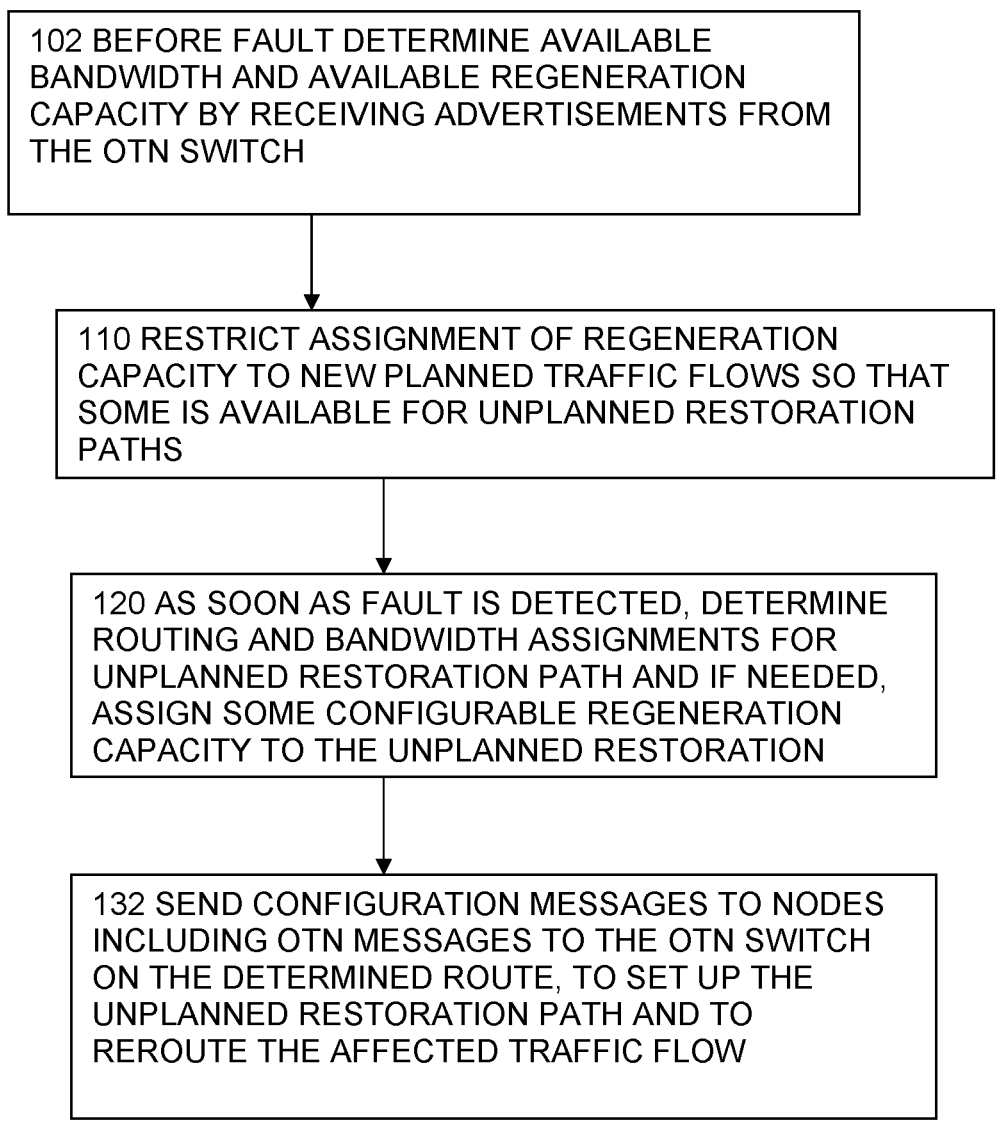

FIG. 6 PCE Steps for OTN Example

Where the electrical switch is an OTN switch, the PCE steps shown in FIG. 3 can be modified as follows. At step 102, before a fault, available bandwidth and available configurable regeneration capacity is determined by receiving advertisement messages from the OTN switch. At step 110, assignment of regeneration capacity to new planned traffic flows is restricted so that some is available for unplanned restoration paths.

At step 120, as soon as a fault is detected, routing and bandwidth assignments are determined for an unplanned restoration path and if needed, some configurable regeneration capacity is assigned to the unplanned restoration path. At step 132, if routing and assigning is successful, then OTN configuration messages are sent to nodes on the determined route, to set up the unplanned restoration path dynamically and to configure OTN switch according to the assignment and to reroute the affected traffic flow. As OTN enables multi rate switching, the configuration message can include indications of bit rates. A corresponding procedure at the regeneration node can be similar to that shown in FIG. 4 with the addition of steps of sending indications of availability at different bit rates, and configuring the OTN switch to switch different bit rates.

Figure 7:
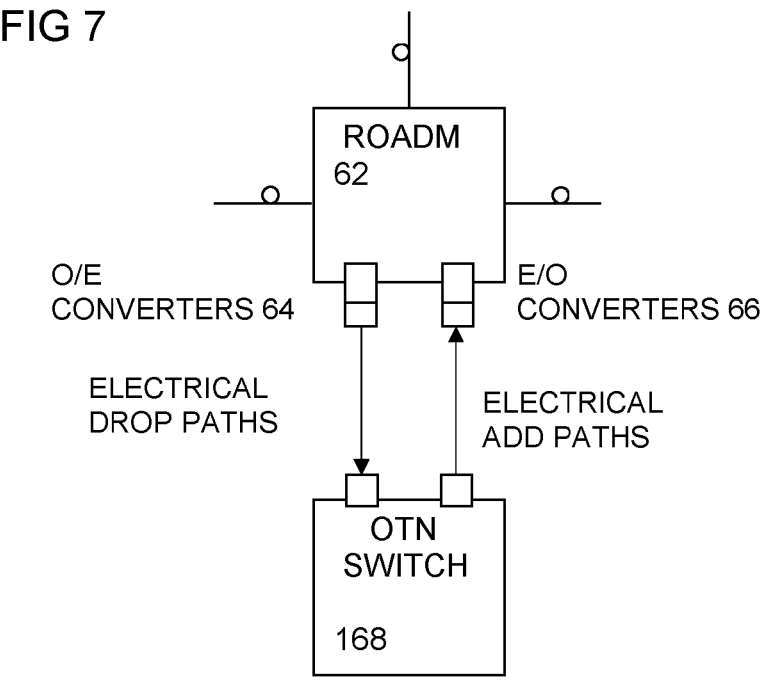
FIGS. 7 and 8 show regeneration nodes according to embodiments
Figure 8:
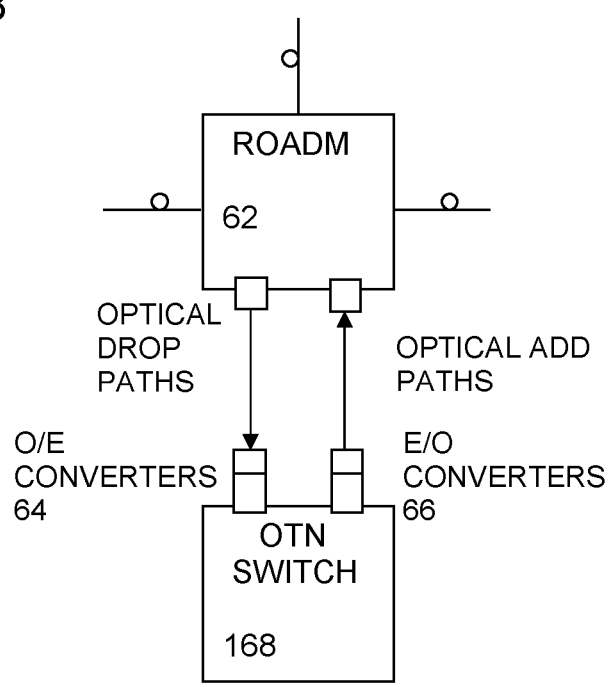

FIGS. 7 and 8, Regeneration Nodes According to Embodiments

FIGS. 7 and 8 show examples of a regeneration node 60 using a multi-degree ROADM 62. This can be based on WSS technology or other technology. These features can apply to direction-bound or direction-less ROADMs. An OTN switch 168 which can be implemented as a switch matrix is connected to an Add/Drop section of the ROADM as an external device. Not all the Add drop ports of the section shall be connected to the OTN Switch. In fact it's assumed that the proposed device provides a regeneration/wavelength conversion service for a subset of the incoming lightpaths. This is a sensible assumption because, in real WSON networks, regeneration resource is considered a scarce and expensive service and is avoided whenever possible.

In FIG. 7 the ROADM is equipped with converters 64, 66 in the form of transponders supporting G.709 OTN framing on the client side. The connection with the OTN Switch 168 is provided using grey fibers. In FIG. 8 the OTN Switch is equipped with converters 64, 66 in the form of a pluggable transceiver such as a DWDM XFP. This shows that the converters can be at either side of the link between the ROADM and the switch. Alien wavelengths (coloured) are fed directly to and from the ROADM and can be coupled to a WSS within the ROADM as will be explained below in relation to FIG. 10.

In order to keep the drawings simple, FIGS. 7 and 8 show just one add/drop pair. In a complete setup, multiple transponders (in FIG. 7) or the pluggable transceivers such as the DWDM XFP (in FIG. 8) ensure the "pit stop" service to multiple lightpaths. Note that in FIG. 7 the OTN Switch functionalities can be performed just by an OTN Matrix (reducing costs).

Some particular cases are possible: If tuneable transponders (FIG. 7) or tuneable DWDM XFP (FIG. 8) are used, it is possible to provide a reconfigurable wavelength conversion service. This simplifies the wavelength assignment process reducing the blocking probability. The tunable transponder is one way of implementing an E/O converter (for tx) and an O/E converter (for rx). In the tx part a tunable transponder has a tunable laser, and for the rx side it has a filter which is adjustable in which wavelength is allowed through to a detector. What can be tuned are the laser and the filter.

Figure 9:
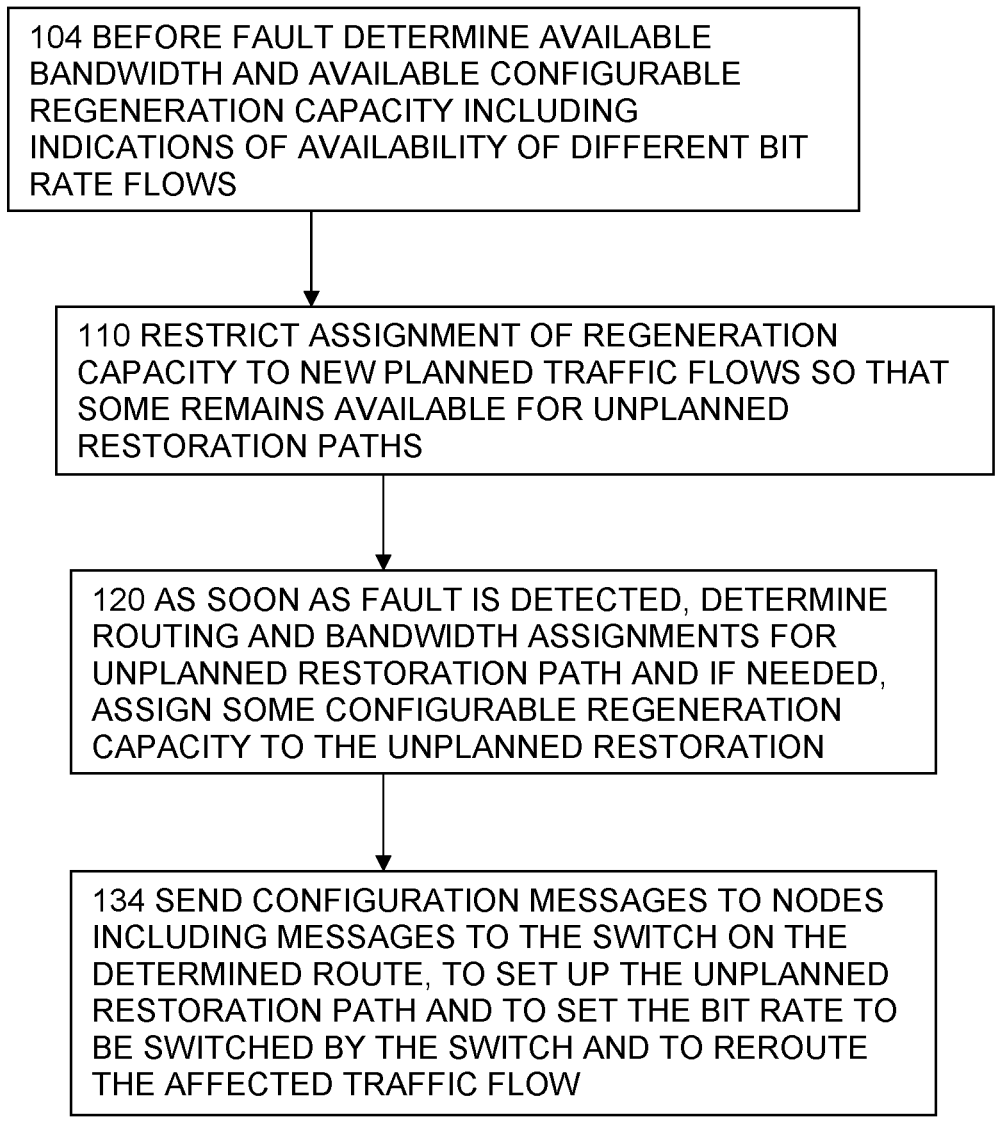
FIG. 9 shows steps involving configurable bit rate switching

FIG. 9, Configurable Bit Rate Switching

Using an OTN switch supporting different OTU-x containers, it's possible to apply the method to multi-bit rate WSONs. A typical case is a WSON where some lightpaths have been upgraded from 10G (ODU-2) to 40G (ODU-3). The two bit rates require a tailored regeneration and thus an OTN Switch having both the OTN layers. In a more long term evolution an OTN Switch supporting the ODU-flex container could serve also a WSON based on a flexigrid comb. The standards and technologies are not mature for this scenario but the principle contained in the method will remain applicable.

FIG. 9 shows steps for a PCE similar to those shown in FIG. 3 but modified as follows for multi rate networks. At step 104, before a fault, available bandwidth and available configurable regeneration capacity is determined by receiving advertisement messages from the node including availability of different bit rate flows. At step 110 assignment of regeneration capacity to new planned traffic flows is restricted so that some is available for unplanned restoration paths. At step 120, as soon as a fault is detected, routing and bandwidth assignments are determined for an unplanned restoration path and if needed, some configurable regeneration capacity is assigned to the unplanned restoration path. At step 134, if routing and assigning is successful, then configuration messages are sent to nodes on the determined route, to set up the unplanned restoration path dynamically and to configure the switch according to the assignment and to reroute the affected traffic flow. As the switch is capable of multi rate switching, the configuration message can include indications of bit rates. A corresponding procedure at the regeneration node can be similar to that shown in FIG. 4 with the addition of steps of sending indications of availability at different bit rates, and configuring the switch to switch the selected bit rate as needed.

Figure 10:
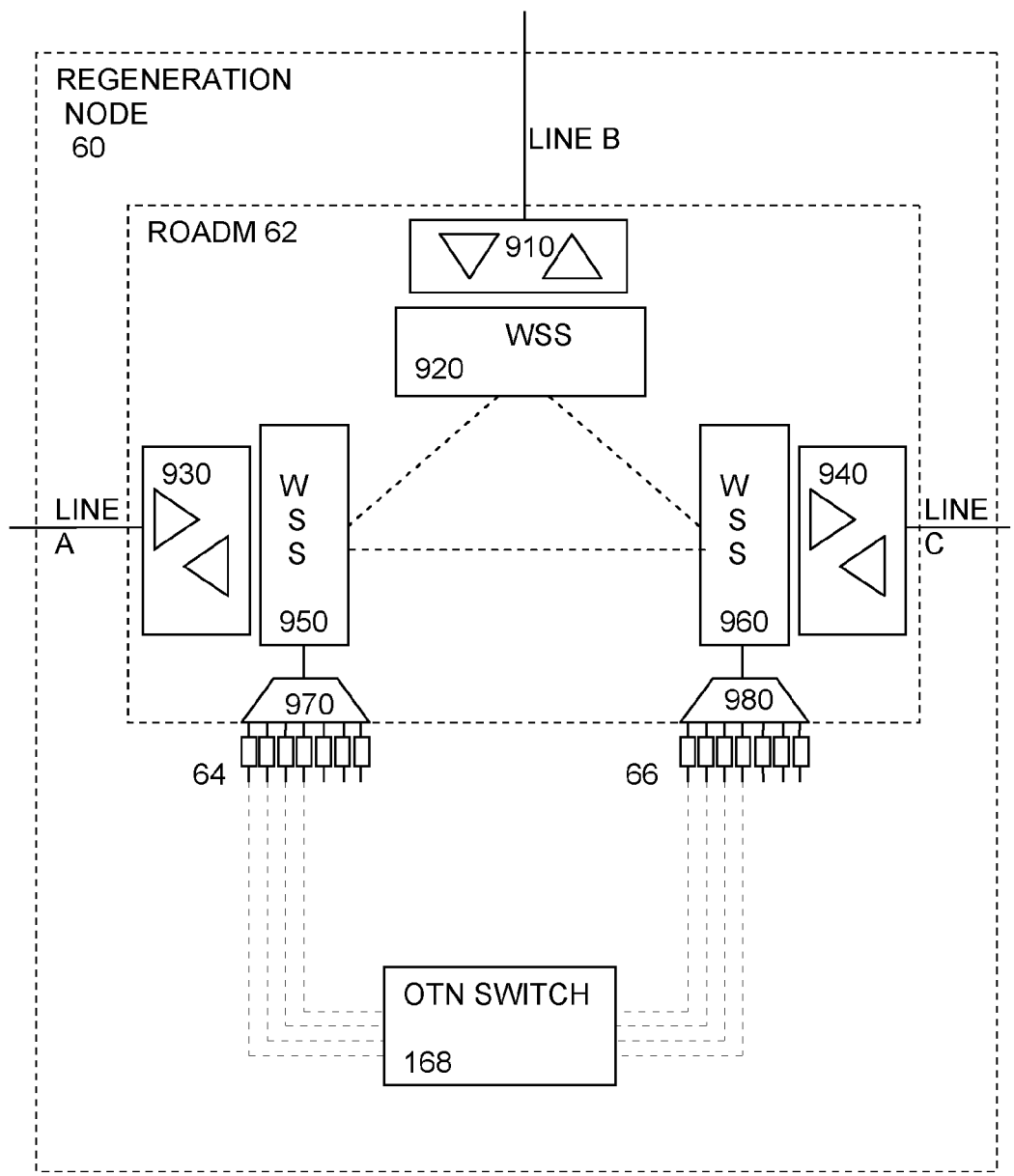
FIG. 10 shows a regeneration node for a WSON 1.x network.

FIG. 10—Regeneration Node in WSON 1.x Network.

FIG. 10 shows a schematic view of an example of a regeneration node with the proposed OTN "pit-stop in a network based on ROADMs operating in a WSON 1.x landscape. In FIG. 10 there is shown a ROADM 62 coupled to an electrical switch in the form of an OTN switch 168 via a bank of O/E converters 64 and E/O converters 66. The ROADM is a multi-way ROADM having bidirectional lines A, B and C to other nodes carrying WDM signals.

The ROADM has an optical amplifier interface part 930 to couple the incoming and outgoing WDM signals on line A to a Wavelength Selective Switch WSS part 950. This demultiplexes the incoming wavelengths and switches them selectively to the corresponding WSSs for either line B or line C. The optical paths within the ROADM between the WSSs can be spatially separate for each wavelength or can be wavelength multiplexed together again between each WSS in principle. At the next WSS, either 920 for line B or 960 for line C, the incoming wavelengths are separated again if needed, so that a selection can be made as to which wavelengths are to be multiplexed together to go out on line B or line C respectively. Hence for each wavelength there are two optical paths arriving at the WSS from other WSSs, and there is an optical switch or selector to select which of the two is selected and passed to a WDM multiplexer within the WSS and then output as a WDM signal to the bidirectional optical amplifier 910 for line B and 940 for line C.

Hence each WSS has a demultiplexer and input wavelength switches for incoming paths, and has output wavelength switches followed by a wavelength multiplexer for outgoing paths.

In addition, WSS 950 is shown as having optical drop paths fed from the input wavelength switches and typically output from the WSS on optical drop paths which may be wavelength multiplexed again to reach a further wavelength demultiplexer 970. Individual wavelengths are fed to individual O/E converters 64. These are coupled to respective electrical drop paths are fed via OTN switch 168 to electrical add paths which connect respective E/O converters 66. The corresponding optical add paths are wavelength specific if the converters are not tunable, but the OTN switch can still configure which drop wavelength is converted to which add wavelength. Thus the same configurable regeneration and wavelength conversion capability is available. It's possible, for example, to receive a lightpath on for example a yellow lambda from Line A and convert it to orange towards Line C or receive the green and convert to yellow. Add multiplexer 980 multiplexes the optical add paths together to reach the WSS 960. Here they are demutiplexed again so that they can be fed as inputs to be selected or not by the output wavelength switch within WSS 960. If selected, the optical add paths are coupled to the wavelength multiplexer and become part of the outgoing WDM signal from line C.

Not shown for the sake of clarity are the corresponding paths in the other direction, from line C dropped by WSS 960, converted to electrical signals, switched by OTN switch 168 and added again as optical signals to go out on line A. Limitations of this arrangement are that it is not colorless, there is limited selection of colors, and is not directionless, there is no selection of which output port is used.

Figure 11:
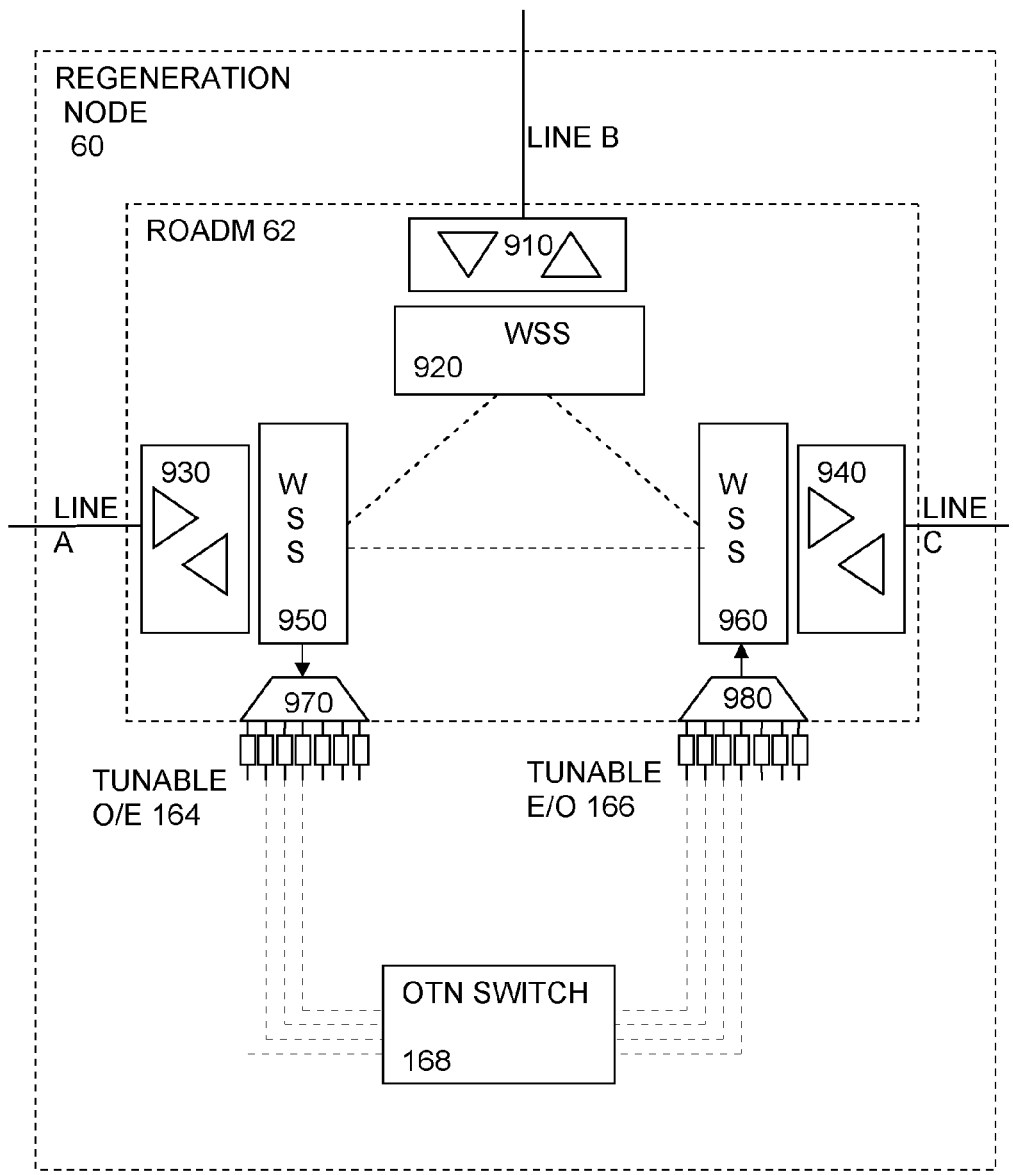
FIG. 11 shows a regeneration node in a colorless version

FIG. 11 Colorless Version

FIG. 11 shows a regeneration node similar to that of FIG. 10 except that the converters are now tunable. This so called colorless version provides more configurability. If there are only a limited number of outgoing wavelength paths on line C kept free for restoration, say four out of one hundred and twenty eight, then any four of the drop paths can be coupled to them, without needing to plan which four colors are to be kept free. This helps to make it easier to find a restoration path more reliably, and thus helps to reduce the amount of spare capacity needed for such restoration. Either or both of the converters can be made tunable. Some or all of the converters can be made tunable. The O/E converter 164 can be tunable either by optical switching of wavelengths into the detector or by providing an adjustable filter to filter the wavelength arriving at the detector. The E/O converter 166 can be made tunable by providing a tunable laser. This is nevertheless still limited in configurability since the regeneration is only on paths between lines A and C.

Figure 12:
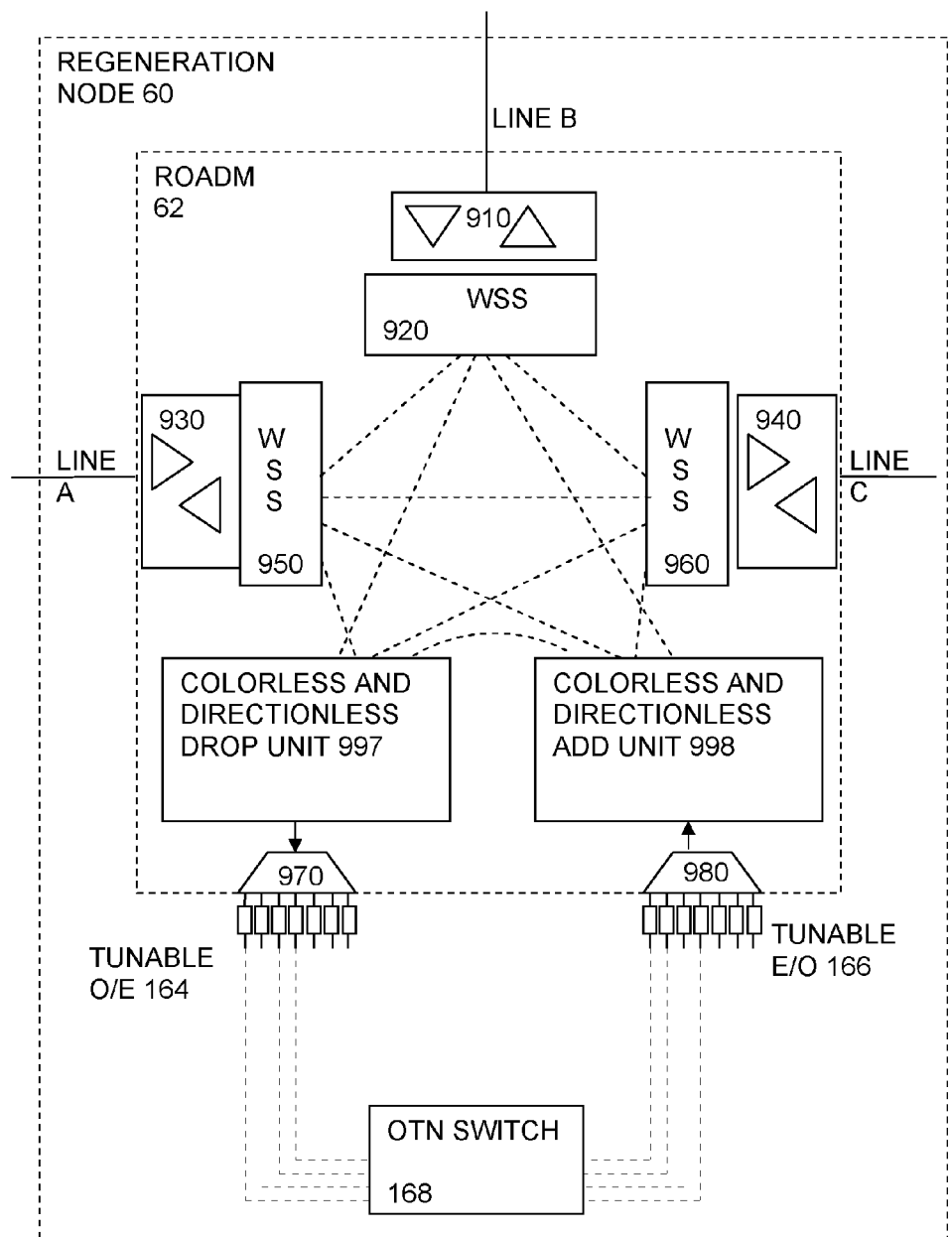
FIG. 12 shows a regeneration node in a directionless and colorless example.

FIG. 12, Directionless and Colorless Example.

FIG. 12 shows a regeneration node similar to that of FIG. 11 but with the addition of parts to enable the regeneration to be directionless. The regenerator (back-to-back transponders) is no more statically associated with its lightpaths. The relevant resources are sharable among lightpaths and can be assigned dynamically. FIG. 12 shows the most flexible configuration having both the colorless and directionless features. Here the proposed "pit-stop" facility can be used to serve all the directions and to convert "from any to any color" in the tunability range and "from any to any" direction.

This is achieved by having a colorless and directionless add unit 998 and a colorless and directionless drop unit 997. Either of these could be included without the other. The drop unit receives internal optical paths from each of the other WSS units. An optical switch is provided for each of the O/E converters and selects which of the WSS units provides an input to that converter. This provides direction selection. The selection can be of wavelength multiplexed signals which are then filtered to provide a single wavelength to each converter.

The add unit 998 receives multiple wavelengths from the tunable E/O converters, and has a corresponding number of optical switches. Each of these optical switches selects whether a given wavelength is fed to the WSS of line A of line B or line C.

As before, the internal optical paths between the WSS units and the add unit 997 and drop unit 998 can be formed of spatially separate wavelength paths or of wavelength multiplexed paths with no spatial separation, in which case multiplexers would be needed within the add unit and demultiplexers in the drop unit.

The configuration message or messages from the PCE would need to specify the OTN switch configuration, and the switch positions for the drop unit 997, the color for either or both of the converters, as well as the switch positions for the OTN switch and the add unit 998. Also the PCE would need to set up the switches inside the WSS units 910, 950, and 960. Correspondingly any indication of remaining configurable regeneration capacity could indicate how many regeneration paths are left available to each of the WSS units from the add unit 998, and how many regeneration paths are left available from each of the WSS units to the drop unit 997.

In principle, the arrangement of FIG. 12 could be made directionless but not colorless by providing fixed wavelength converters rather than tunable converters. If wavelength selective switches are provided in the drop unit 997, then there may be no need for tunable O/E converters, as the wavelength selective switches could achieve the same function.

PCE Information

The PCE, in order to be able to calculate paths, has to have information about the network resources and topology, and how much capacity is still available for new paths. In GMPLS, the participating control plane nodes synchronize their network view. That is, they advertise the TE information of their local resources and collect the advertisement of other nodes. For this purpose they use a Traffic Engineering extended version of the routing protocols, such as OSPF-TE, as described in IETF RFC 3630: "Traffic Engineering (TE) extensions to OSPF version 2", or ISIS-TE, as described in IETF RFC 3784: "Intermediate System to Intermediate System (ISIS) Extensions for Traffic Engineering (TE)".

The PCE participates in the resource advertisement procedure and thus collects the TE information, in the same way as the other nodes. The PCE may also advertise its capabilities to the PCCs using OSPF-TE, as described in IETF RFC 5088: "OSPF Protocol Extensions for Path Computation Element (PCE) Discovery", or ISIS-TE as described in IETF RFC 5089: "IS-IS Protocol Extensions for Path Computation Element (PCE) Discovery". The IETF individual draft document "draft-lee-pce-ted-alternatives-02.txt" provides an alternative method where the PCE collects the TE information directly from the nodes.

For planning and routing of lightpaths, the PCE can have a Physical validation module PV to calculate parameters for interfaces of each optical section of the network. The interface can be defined in terms of one or more of a bit rate, line coding type and modulation type. A set of parameters is calculated for interfaces supported by an optical section. The set of parameters for an interface of an optical section are indicative of transmission quality along the optical section, taking into account the traffic type (bit rate, modulation, line coding), and the impairments of the optical section. The module stores the calculated parameters for each interface and each optical section in a Traffic Engineering Database (TED). The PCE responds to requests for the routing of lightpaths in the network and uses its PV module to determine the feasibility of possible routings of a requested lightpath across network. The PV module can use the pre-computed parameters, stored in TED, for each optical section of the network to determine whether a routing of the requested lightpath is feasible. Parameters for the optical sections in a candidate lightpath are analytically combined to determine if the path is feasible.

RFC 6163 Wavelength Switched Optical Networks April 2011 indicates that for wavelength assignment, it is necessary to know which specific wavelengths are available and which are occupied if a combined RWA process or separate WA process is run. This is currently not communicated with GMPLS routing. In the routing extensions for GMPLS [RFC4202], requirements for layer-specific TE attributes are discussed. RWA for optical networks without wavelength converters imposes an additional requirement for the lambda (or optical channel) layer: that of knowing which specific wavelengths are in use. Note that current DWDM systems range from 16 channels to 128 channels, with advanced laboratory systems with as many as 300 channels. Given these channel limitations, if the approach of a global wavelength to label mapping or furnishing the local mappings to the PCEs is taken, representing the use of wavelengths via a simple bitmap is feasible.

A WSON Routing Information Summary is given in the following table. It summarizes the WSON information that could be conveyed via GMPLS routing and attempts to classify that information according to its static or dynamic nature and its association with either a link or a node.

| Information | Static/Dynamic | Node/Link |
| --- | --- | --- |
| Connectivity matrix | Static | Node |
| Per-port wavelength restrictions | Static | Node(1) |
| WDM link (fiber) lambda ranges | Static | Link |
| WDM link channel spacing | Static | Link |
| Optical transmitter range | Static | Link(2) |
| Wavelength conversion capabilities | Static(3) | Node |
| Maximum bandwidth per wavelength | Static | Link |
| Wavelength availability | Dynamic(4) | Link |
| Signal compatibility and processing | Static/Dynamic | Node |

Note (1).
These are the per-port wavelength restrictions of an optical device such as a ROADM and are independent of any optical constraints imposed by a fiber link.
Note (2).
This could also be viewed as a node capability.
Note (3).
This could be dynamic in the case of a limited pool of converters where the number available can change with connection establishment. It may be desirable to include regeneration capabilities here since OEO converters are also regenerators.
Note (4).
This is not necessarily needed in the case of distributed wavelength assignment via signaling.

While the full complement of the information from the previous table is needed in the Combined RWA and the separate Routing and WA architectures, in the case of Routing+Distributed WA via Signaling, only the following information is needed, since much of the path validation checking is only done by trying out potential paths by signaling:

| Information | Static/Dynamic | Node/Link |
| --- | --- | --- |
| Connectivity matrix | Static | Node |
| Wavelength conversion capabilities | Static(3) | Node |

Information models and compact encodings for this information can be envisaged following established practice.

Figure 13:
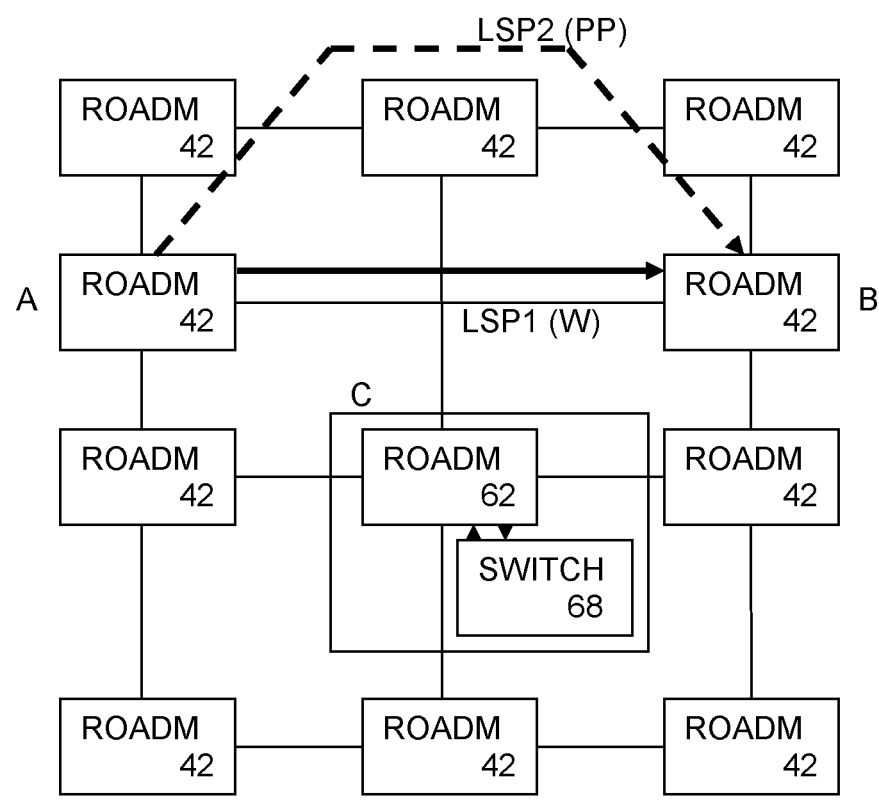
FIGS. 13 and 14, show a network view.
Figure 14:
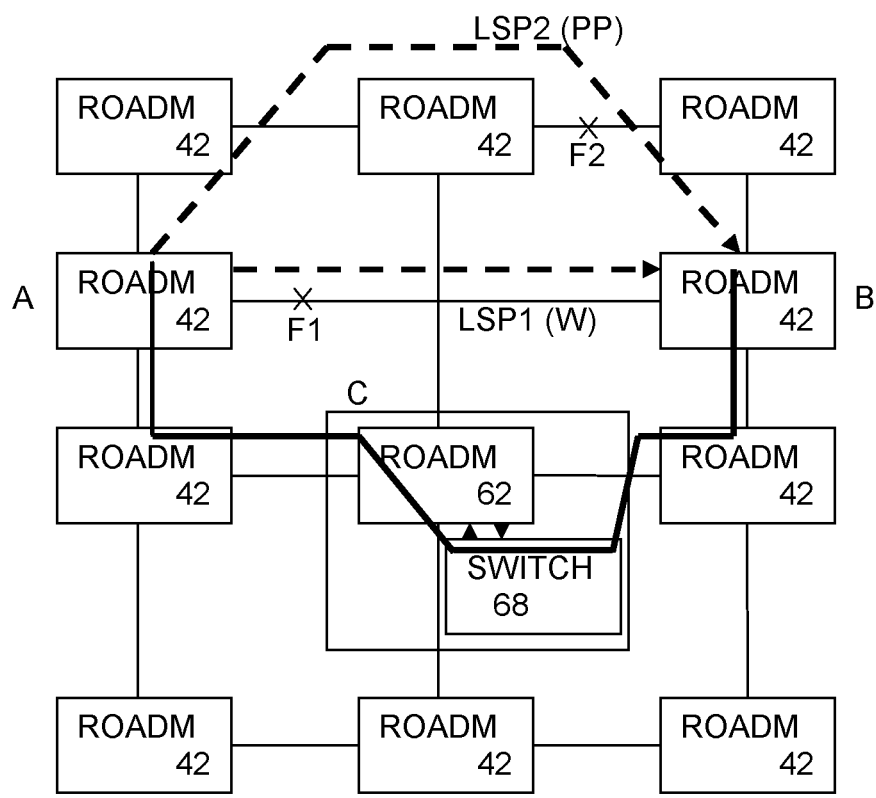

FIGS. 13, 14, Network View

One application of the proposed regeneration node and restoration method is a GMPLS controlled mesh having distributed control plane architecture. A Path Computation Element (PCE), centralized in the NMS or distributed in network nodes, can now leverage on a set of "pit stop" enabled nodes. In the event of failures, not recoverable using preplanned schemes, the PCE can compute OTF recovery paths also with long un-planned detours towards the destination. Paths that were discarded in the planning phase for lack of wavelength continuity can now be considered by using the wavelength conversion facility, if available, in some "pit stops" at regeneration nodes on the road. For better understanding a simple example is shown in FIGS. 13 and 14.

These figures show nodes 42 in a part of a network and show one working path through the nodes, one preplanned protection path, and in FIG. 14, where faults are shown on both these paths, there is an unplanned restoration path avoiding both faults using a regeneration node. FIG. 13 shows a worker lightpath LSP1 (W) activated between a node A and node B on an "orange" wavelength. A pre-planned (PP) alternative path LSP2 is shown by a dotted line through other nodes, between A and B, ready for recovery in case of single fault.

As shown in FIG. 14, unluckily, a couple of faults F1 and F2 affect both LSP1 and LSP2. In a state of the art WSON, if no other PP LSPs are available, the traffic is lost. According to an embodiment of the invention, where there is a "pit-stop" regeneration node C, a new feasible LSP3 path can be activated OTF. Note that the pit stop is used here to allow a longer detour (more kms requires regeneration in between) and to solve the wavelength continuity puzzle from A to B across this new path (by swapping from an "orange" wavelength to a "pink" wavelength in C).

When one or both the failures are repaired, the traffic could be reverted on the original path(s) and the valuable "pit-stop" resources could be released to serve following unpredicted failure events. In some particular cases, if the "pit stop" enabled regeneration nodes are sparse in the network, a restoration lightpath could appear to loop or "backtrack" upon itself in order to reach a "pit-stop" prior to continuing on to its destination. The lambda used on the "detour" out to the wavelength converter could be different from that coming back from the "detour" to the wavelength converter. The optimal number of "pit-stop" nodes, with respect to the total number of nodes in the network, can be defined in the planning phase also considering the desired lever of resiliency and blocking probability. Another parameter to define in the planning phase is the portion of wavelengths that are sent to the OTN Switch, with respect to the number of wavelengths in the comb. This has an impact on the dimension of the OTN Switch, and so on its cost, but more savings will be achieved at a network level by having the same level of resiliency with a minor required hardware redundancy ("less PP, more OTF").

CONCLUDING REMARKS

Embodiments are based on dynamic restoration by routing and bandwidth assignment of an unplanned restoration path in a wavelength switched optical network 20, having regeneration nodes 60, the regeneration nodes each having a ROADM 62 having drop paths and add paths, and an electrical switch 68 to provide configurable regeneration capacity by coupling selected drop paths to selected add paths. Some of the configurable regeneration capacity is kept for unplanned restoration paths. A PCE determines 120 routing and bandwidth assignments for an unplanned restoration path for the traffic flow to avoid a fault, and sends 130 configuration messages to the nodes to set up the unplanned restoration path dynamically and to configure the electrical switch to provide regeneration on the path. Many variations and additions to these embodiments can be envisaged. The combination or provision of regeneration nodes with reconfigurable regeneration capacity, and the method of restricting their assignment so that some configurable restoration capacity is available for use by unplanned restoration paths is an enabler of the OTF approach in WSON. It can reduce the risk of blocking to make OTF cost effective. It can therefore reduce the TCO. It can be compatible with conventional ROADM architecture because the "pit-stop" service can be provided by connecting an OTN Switch (or simply a OTN Matrix in some cases) externally to a conventional ROADM. The method and apparatus setup is suitable for a centralized or distributed online PCE and for a distributed control plane architecture. It can be applicable to different ROADM and other types of electrical switch equipments.

The invention claimed is:

1. A method of dynamic restoration by routing and bandwidth assignment of an unplanned restoration path in a wavelength switched optical network, to restore a traffic flow after a fault, the wavelength switched optical network having multiple nodes, of which one or more are regeneration nodes, the regeneration nodes each having a ROADM having optical drop paths and optical add paths, the regeneration nodes also having electrical drop paths coupled by O/E converters to respective ones of the optical drop paths, electrical add paths coupled by E/O converters to the optical add paths, and an electrical switch for making interconnections between the converters to provide configurable regeneration capacity by coupling selected ones of the electrical drop paths to respective selected ones of the electrical add paths, the method comprising:
before the fault, determining what bandwidth is currently available between at least some of the nodes, and how much of the configurable regeneration capacity is currently available at the regeneration nodes;
restricting assignment of at least some of the configurable regeneration capacity so that at least some remains available for unplanned restoration paths, and, after detection of the fault;
determining routing and bandwidth assignments for the unplanned restoration path for the traffic flow avoiding the fault, and if needed, assigning some of the currently available configurable regeneration capacity to the unplanned restoration path;
sending configuration messages to the nodes of the determined route to set up the unplanned restoration path dynamically and to configure the electrical switch at a respective one of the regeneration nodes according to the assignment of regeneration capacity, and to reroute the traffic flow onto the unplanned restoration path.

2. The method of claim 1, further comprising, before setting up the unplanned restoration path, of trying to use a planned protection path for the traffic flow, and then sending the configuration messages if the planned protection path fails.

3. The method of claim 1, wherein the electrical switch comprises an OTN switch supporting G.709 framing, and the step of determining the currently available regeneration capacity comprises the step of receiving OTN advertisements from the OTN switch, and the step of sending configuration messages to the electrical switch comprises sending OTN switch configuration messages.

4. The method of claim 1, wherein the electrical switch is an external equipment, external to the ROADM.

5. The method of claim 1, wherein the network is a multi-rate network capable of switching traffic flows of different bit rates, and the electrical switch is configurable to switch traffic flows of different bit rates, the step of determining the currently available regeneration capacity comprises determining for the electrical switch how many new traffic flows of each of the different bit rates can be switched, and the step of sending configuration messages comprises sending messages to the electrical switch to configure the bit rate to be switched.

6. The method of claim 1, wherein at least some of the E/O converters have a tunable optical wavelength, and the step of sending configuration messages comprises sending messages to tune the optical wavelength of a tunable converter used in the restoration path.

7. The method of claim 1, wherein the regeneration node has a wavelength switching element for switching an add optical signal to one of two or more outputs coupled to different neighbouring nodes, and the step of sending configuration messages comprises sending messages to configure the wavelength switching element to set up the restoration path.

8. The method of claim 1, wherein the network has one or more path computation elements, and the path computation elements each have a dedicated module for carrying out the step of determining the routing and bandwidth assignments for the unplanned restoration path for the traffic flow avoiding the fault.

9. A method of using a regeneration node for dynamic restoration using an unplanned restoration path in a wavelength switched optical network, to restore a traffic flow after a fault, the wavelength switched optical network having a path computation element and having multiple nodes, of which one or more are regeneration nodes, the regeneration nodes each having a ROADM having optical drop paths and optical add paths, the regeneration nodes also having electrical drop paths coupled by O/E converters to respective ones of the optical drop paths, electrical add paths coupled by E/O converters to the optical add paths, and an electrical switch for configuring the converters to provide configurable regeneration capacity by coupling selected ones of the electrical drop paths to respective selected ones of the electrical add paths, the method comprising:
before the fault, sending messages to the path computation element indicating how much of the configurable regeneration capacity is currently available for unplanned restoration paths, wherein the path computation element is configured to restrict an assignment of at least some of the configurable regeneration capacity so that at least some remains available for unplanned restoration paths, and, after detection of the fault, is configured to determine routing and bandwidth assignments for the unplanned restoration path for the traffic flow avoiding the fault, and if needed, is configured to assign some of the currently available configurable regeneration capacity to the unplanned restoration path;

receiving configuration messages from the path computation element indicating an assignment of regeneration capacity for an unplanned restoration path;

configuring the electrical switch according to the indicated assignment; and regenerating the traffic flow on the unplanned restoration path.

10. A computer program stored on a computer readable medium and having instructions which when executable by a processor, cause the processor to carry out the method of claim 1.

11. A method of adapting a wavelength switched optical network to provide for dynamic restoration to restore a traffic flow after a fault, the wavelength switched optical network having multiple nodes and a path computation element, the method comprising:

providing one or more regeneration nodes, the regeneration nodes each having a ROADM having optical drop paths and optical add paths, the regeneration nodes also having electrical drop paths coupled by O/E converters to respective ones of the optical drop paths, electrical add paths coupled by E/O converters to the optical add paths, and an electrical switch for making interconnections between the converters to provide configurable regeneration capacity by coupling selected ones of the electrical drop paths to respective selected ones of the electrical add paths; and adapting the path computation element so as to:

before the fault, determine what bandwidth is currently available between at least some of the nodes, and how much of the configurable regeneration bandwidth is currently available at the regeneration nodes;

restrict assignment of at least some of the configurable regeneration capacity so that some remains available for unplanned restoration paths, and the method also having the step of adapting the path computation element so as to, after detection of the fault;

determine routing and bandwidth assignments for the unplanned restoration path for the traffic flow avoiding the fault, and if needed, assign some of the currently available configurable regeneration capacity to the unplanned restoration path;

send configuration messages to the nodes of the determined route, to set up the unplanned restoration path dynamically and to configure the electrical switch at a respective one of the regeneration nodes according to the assignment of regeneration capacity, and to reroute the traffic flow onto the unplanned restoration path.

12. The method of claim 11, wherein the step of adapting the path computation element comprising, before setting up the unplanned restoration path, the path computation element attempting to use a planned protection path for the traffic flow, and then sending the configuration commands if the planned protection path fails.

13. The method of claim 11, wherein the electrical switch comprises an OTN switch supporting G.709 framing, and the step of adapting the path computation element is arranged so that it determines the currently available regeneration capacity by receiving OTN advertisements from the OTN switch, and it sends configuration messages in the form of OTN switch configuration messages.

14. The method of claim 11, wherein the step of providing the regeneration node comprises adding the electrical switch externally to the ROADM.

15. The method of claim 11, wherein the network is a multi-rate network capable of switching traffic flows of different bit rates, and the electrical switch is configurable to switch traffic flows of different bit rates, the step of adapting the path computation element having the step of adapting it to determine the currently available regeneration capacity by determining for the electrical switch how many new traffic flows of each of the different bit rates can be switched, and adapting the step of sending configuration messages by sending messages to the electrical switch to configure the bit rate to be switched.

16. A path computation element for routing and bandwidth assignment for a wavelength switched optical network having multiple nodes, of which one or more are regeneration nodes, the regeneration nodes each having a ROADM having optical drop paths and optical add paths, the regeneration nodes also having electrical drop paths coupled by O/E converters to respective ones of the optical drop paths, electrical add paths coupled by E/O converters to the optical add paths, and an electrical switch for making interconnections between the converters to provide configurable regeneration capacity by coupling selected ones of the electrical drop paths to respective selected ones of the electrical add paths, the path computation element comprising:

a communications link to the nodes; and a processor arranged to:

determine, before a fault occurs, what bandwidth is currently available between at least some of the nodes, and how much of the configurable regeneration capacity is currently available at the regeneration nodes, restrict assignment of at least some of the configurable regeneration capacity so that at least some remains available for unplanned restoration paths, after detection of a fault, the processor is further arranged to determine routing and bandwidth assignments dynamically for an unplanned restoration path for restoring the traffic flow avoiding the fault, and if needed, assign some of the currently available regeneration capacity to the unplanned restoration path, and the processor is further arranged to send configuration messages to the nodes of the determined route, to set up the unplanned restoration path dynamically and to configure the electrical switch at a respective one of the regeneration nodes according to the assignment of regeneration capacity and to reroute the traffic flow onto the unplanned restoration path.

17. The element of claim 16, wherein the processor is arranged to, before setting up the unplanned restoration path, try to use a planned protection path for the traffic flow, and then to send the configuration messages if the planned protection path fails.

18. The element of claim 16, wherein the electrical switch comprises an OTN switch supporting G.709 framing, and the processor is arranged to determine the currently available regeneration capacity by receiving OTN advertisements from the OTN switch, and the processor being arranged to send the configuration messages in the form of OTN switch configuration messages.

19. The element of claim 16, wherein the network is a multi-rate network capable of switching traffic flows of different bit rates, and the electrical switch is configurable to switch traffic flows of different bit rates, the processor being arranged to determine the currently available regeneration capacity by determining for the electrical switch how many new traffic flows of each of the different bit rates can be switched, and the processor being arranged to send messages to the electrical switch to configure the bit rate to be switched.

20. The element of claim 16, wherein at least some of the E/O converters have a tunable optical wavelength, and the processor is arranged to send configuration messages to tune the optical wavelength of a tunable converter used in the restoration path.

21. The element of claim 16, wherein the regeneration node has a wavelength switching element for switching an add optical signal to one of two or more outputs coupled to different neighbouring nodes, and the processor is arranged to send configuration messages to configure the wavelength switching element to set up the restoration path.

22. A regeneration node for a wavelength switched optical network, the wavelength switched optical network having a path computation element and having multiple nodes, of which one or more are regeneration nodes, the regeneration node comprising:

a ROADM having optical drop paths and optical add paths;

electrical drop paths coupled by O/E converters to respective ones of the optical drop paths, electrical add paths coupled by E/O converters to the optical add paths, and an electrical switch for making interconnections between the converters to provide configurable regeneration capacity by coupling selected ones of the electrical drop paths to respective selected ones of the electrical add paths; and a communications link for messages to or from the path computation element and being arranged to send messages to the path computation element to indicate how much of the configurable regeneration capacity is currently available, before any fault is detected, wherein the path computation element is configured to restrict an assignment of at least some of the configurable regeneration capacity so that at least some remains available for unplanned restoration paths, and, after detection of the fault, is configured to determine routing and bandwidth assignments for the unplanned restoration path for the traffic flow avoiding the fault, and if needed, is configured to assign some of the currently available configurable regeneration capacity to the unplanned restoration path, wherein the regeneration node is arranged to receive a configuration message from the path computation element after a fault has been detected, the configuration message indicating an assignment of the configurable regeneration capacity, and the regeneration node is arranged to configure the ROADM and the electrical switch according to the received assignment and to regenerate the traffic flow on the unplanned restoration path within the optical path.

* * * * *